US009170116B1

(12) United States Patent
Joshi et al.

(10) Patent No.: US 9,170,116 B1
(45) Date of Patent: Oct. 27, 2015

(54) METHOD FOR GENERATING ACCURATE LANE LEVEL MAPS

(71) Applicant: Toyota Motor Engineering & Manufacturing North America, Inc., Erlanger, KY (US)

(72) Inventors: Avdhut S. Joshi, Ann Arbor, MI (US); Michael R. James, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/329,363

(22) Filed: Jul. 11, 2014

(51) Int. Cl.
*G01C 21/32* (2006.01)
*G06K 9/46* (2006.01)

(52) U.S. Cl.
CPC .............. *G01C 21/32* (2013.01); *G06K 9/4604* (2013.01)

(58) Field of Classification Search
CPC .............. G05D 1/0246; G05D 1/0251; G06K 9/00476; G06K 9/46; G06K 9/4604; G06K 9/4638; G06K 9/6297; G01C 21/32
See application file for complete search history.

(56) References Cited

U.S. PATENT DOCUMENTS

| 2009/0012709 | A1* | 1/2009 | Miyazaki | 701/223 |
| 2010/0266161 | A1* | 10/2010 | Kmiecik et al. | 382/103 |
| 2012/0310504 | A1 | 12/2012 | DuHadway et al. | |
| 2012/0310516 | A1 | 12/2012 | Zeng | |

FOREIGN PATENT DOCUMENTS

KR 762507 B1 7/2013

OTHER PUBLICATIONS

Biagioni, et al., Inferring Road Maps from GPS Traces: Survey and Comparative Evaluation, Undated, in 21 pages.
Green, Trans-Dimensional Markov Chain Monte Carlo, Undated, in 28 pages.
Khan, et al., An MCMC-Based Particle Filter for Tracking Multiple Interacting Targets, Undated, in 12 pages.
Yilmaz, et al., Object Tracking: A Survey, Undated, in 45 pages.
Isard, et al., Condensation—Conditional Density Propagation for Visual Tracking, 1998, in 24 pages.
Huang, et al., Probabilistic Lane Estimation Using Basis Curves, Undated, in 8 pages.
Aly, Real Time Detection of Lane Markers in Urban Streets, Undated, in 6 pages.
Biagioni, et al. Inferring Road Maps from Global Positioning System Traces Survey and Comparative Evaluation, Undated, in 11 pages.
Urmson, et al. Autonomous Driving in Urban Environments: Boss and the Urban Challenge, 2008, in 42 pages.

(Continued)

*Primary Examiner* — Thomas Tarcza
*Assistant Examiner* — Kevin Myhre
(74) *Attorney, Agent, or Firm* — Christopher G. Darrow; Darrow Mustafa PC

(57) ABSTRACT

A method for generating accurate lane level maps based on coarse map information and image sensor data captured during the pass of a sensor carrying vehicle along a road. The method generates accurate lane estimates including any of the center of each lane, the number of lanes, and the presence of any bicycle paths, and entrance and exit ramps, merging of two lanes into one lane, or the expansion of one lane into two lanes, using a computer-implemented method where the coarse map data and the image sensor data are subjected to dual reversible jump-Markov chain Monte Carlo filtering.

12 Claims, 7 Drawing Sheets

(56) References Cited

OTHER PUBLICATIONS

Doshi, et al., Tactical Driver Behavior Prediction and Intent Inference: A Review, 2011, in 6 pages.
Sehestedt, et al., Efficient Lane Detection and Tracking in Urban Environments, Undated, in 6 pages.
Geiger, et al., Vision Meets Robotics: The KITTI Dataset, Undated, in 6 pages.
Levinson, et al., Towards Fully Autonomous Driving: Systems and Algorithms, Undated, in 6 pages.
Levinson, et al., Map-Based Precision Vehicle Localization in Urban Environments, Undated, in 8 pages.
Thrun, et al., Robust Monte Carlo Localization for Mobile Robots, Artificial Intelligence, 2001, in 49 pages.
Oliver, et al., Driver Behavior Recognition and Prediction in a SmartCar, Undated, in 11 pages.
Fairfield, et al., Traffic Light Mapping and Detection, Undated, in 6 pages.
Guizzo, How Google's Self-Driving Car Works, 2011, in 3 pages.
Nedevschi, et al., Accurate Ego-Vehicle Global Localization at Intersections Through Alignment of Visual Data With Digital Map, IEEE Transactions on Intelligent Transportation Systems, 2013, vol. 14, No. 2.
Boyko, et al., Extracting Roads from Dense Point Clouds in Large Scale Urban Environment, Undated, in 16 pages.
Curran, et al, Open Street Map, International Journal of Interactive Communication Systems and Technologies, 2012, 2(1), pp. 69-78.
Thrun, et al., The GraphSLAM Algorithm with Applications to Large-Scale Maping of Urban Structures, Undated, in 27 pages.
Wang, et al., Automatic Road Extraction from Mobile Laser Scanning Data, 2012, in 4 pages.
McMichael, Lane Detection for DEXTER, an Autonomous Robot, in the Urban Challenge, 2008, in 108 pages.
Meuter, et al., A Novel Approach to Lane Detection and Tracking, 2009, in 6 pages.
Heikkinen, Trans-dimensional Bayesian Nonparametrics with Spatial Point Processes, Undated, in 4 pages.
Godsill, Proposal Densities, and Product Space Methods, Undated, in 4 pages.
Smith, et al., Using Particles to Track Varying Numbers of Interacting People, Undated, in 8 pages.

\* cited by examiner

METHOD FOR GENERATING ACCURATE LANE LEVEL MAPS

BACKGROUND

The present method relates, in general, to methods for generating accurate maps and, more particularly, to methods and apparatus for generating road lane maps.

Coarse maps, in either printed or digitally displayed form, show a road as a single line or as two narrowly spaced lines. The width of the line or the space between spaced lines, as the case may be, may be proportional to the actual width of the road. However, such maps do not show the number of lanes in the road or additional exit lanes, bicycle lanes, etc.

Fully automated driving systems are designed to operate a vehicle on a road without driver interaction or other external control, for example, in self-driving or autonomous vehicles. Such systems require maps that encode lane level information at high degrees of precision. The lane level information is used in a variety of situations, such as for generating smooth trajectory for path planning, to predict the behavior of other vehicles, or for planning and reasoning proper vehicle behavior at intersections.

In many cases, such maps are generated either through a tedious manual annotation process, by driving the exact lane layout with a test vehicle or by analyzing a collection of GPS tracks. These methods require significant amounts of manual work, either through annotation or for collection, and may still result in low accuracy maps unless all lanes are driven or due to changes in the number of lanes, or lack of lane identifications, such as at intersections.

It would be desirable to provide accurate lane level maps with less preparation effort.

SUMMARY

A method, implemented on a computer, for determining lane characteristics of a road includes obtaining image sensor generated road lane marker data representing road lane markers on a road, accessing coarse road map data representing the road, determining road segment node locations from the coarse road map data, tying the road lane marker data to the road segment node locations, and applying dual reversible jump-Markov chain Monte Carlo (dual RJ-MCMC) filtering to the tied road lane marker data and the road segment node locations and to lane characteristics estimates for the road at the segment node locations.

In the method, filtering is used to estimate the characteristics of one of a bicycle lane adjacent to one lane of a road, and a road exit lane, and a road entrance lane.

In the method, filtering is used to detect a transition of one road lane into at least one additional road lane and a transition of two side-by-side road lanes into one road lane.

The method refines the road lane marker data by use of a GraphSlam algorithm.

In the method, the tying of the road lane marker data to the road segment node locations includes generating each of the road segment node locations one at a time, computing an angle of one road segment node location to an adjacent road segment node location, finding all of the line segments lateral to the one road segment node location within a rectangle including the road segment node location, forming a set of the found line segments, filtering the set of found line segments, clustering the line segments in the filtered set of found line segments to form a set of lane markers, computing, for each lane marker in the set of lane markers, a mean offset distance from the one road segment node location, grouping the lane markers in the set of lane markers longitudinally, and calculating binary features of the lane markers.

In the method, the lane characteristics estimates include at least one of the number of lanes, the width of the lanes, and the center of each lane for the road at the road segment node locations.

In the method, the image sensor generated road lane marker data is obtained by equipping a vehicle with a GPS locator, and a rotating laser beam and a reflected laser beam detector, moving the vehicle along one lane of a road, and detecting the intensity of the laser beam reflected from reflective road markers on all lanes of the road as the vehicle moves along the one lane of the road.

BRIEF DESCRIPTION OF THE DRAWING

The various features, advantages and other uses of the present method for generating accurate lane level maps will become more apparent by referring to the following detailed description and drawings in which.

DETAILED DESCRIPTION

Figure 1:
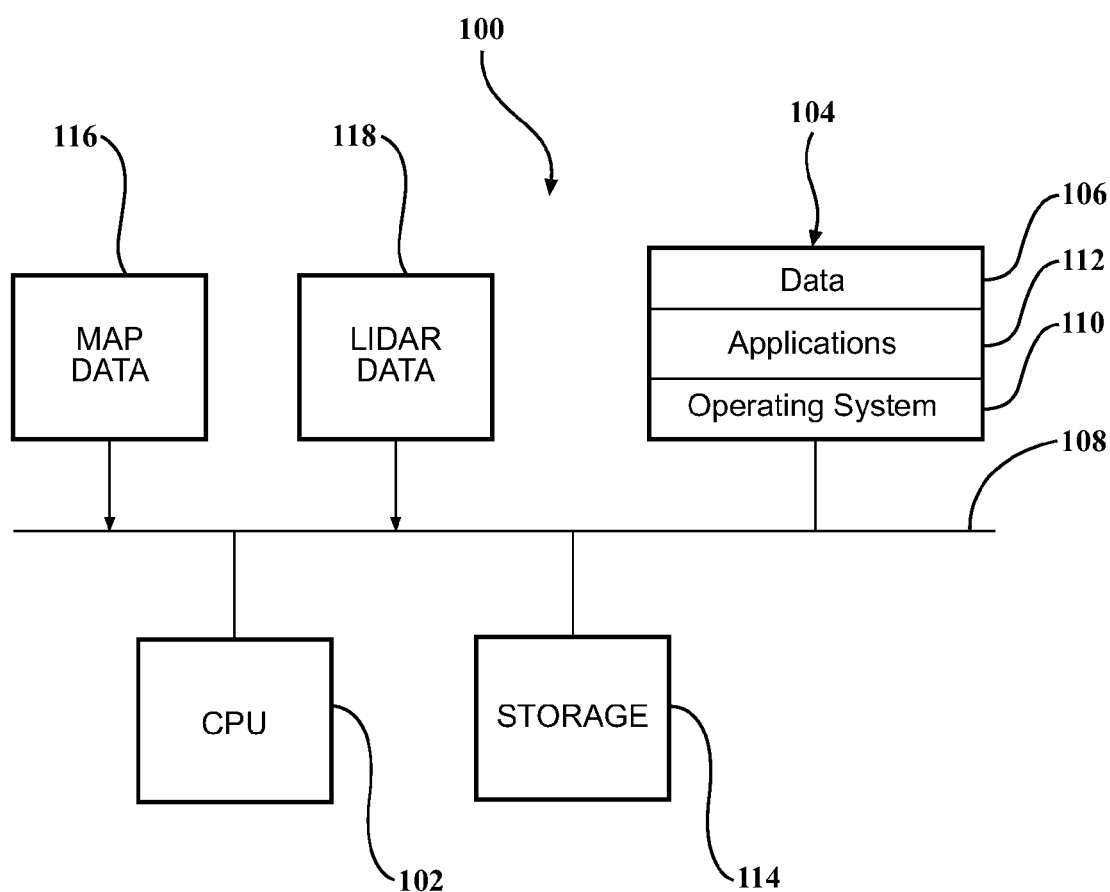
FIG. 1 is a block diagram of a computing device for implementing the disclosed method.

A method for generating accurate lane level maps is implemented on a computing device 100 shown in block diagram form in FIG. 1. The computing device 100 can be any type of computing device, including a handheld, desktop, or other form of single computing device, or it can be formed of multiple computing devices. A CPU 102 in the computing device 100 can be a central processing unit or any other type of device, or multiple devices, capable of manipulating or processing information. A memory 104 in the computing device 100 can be a Random Access Memory device (RAM) or any other suitable type of storage device. The memory 104 can include data 106 that is accessed by the CPU 102 using a bus 108. The memory 104 can also include an operating system 110 and installed applications 112. The installed applications 112 include programs that permit the CPU 102 to perform the lane level map generation method described herein.

The computing device 100 can also include secondary, additional, or external storage 114, for example, a memory card, flash drive, or other forms of computer readable medium. The installed applications 112 can be stored in whole or in part in the secondary storage 114 and loaded into the memory 104 as needed for processing.

The computing device 100 receives an input in the form of rough or coarse map data 116, such as coarse map data 116 received from the OpenStreetMap (OSM) project and sensor data 118, such as sensor data 118 obtained from an image data collection system including sensors mounted on a vehicle which also includes a high-precision vehicle positioning system. The images may be obtained from any suitable image sensor or sensors, including 3D Lidar, downward pointing 2D Lidar, as well as stereo and monocular cameras. Such image sensors can provide multi-lane road marker positions.

The map data 116 and sensor data 118 may be stored in the memory 104 and/or the secondary storage 114.

A test vehicle carrying the above described sensors, typically used in autonomous vehicle systems, generates the sensor data 118. For the position portion of the sensor data 118, pose and motion estimates can come from an Applanix POS-LV 220 inertial GPS Navigational System. This system generates pose estimates at 100 Hz. For the image portion of the sensor data 118, Lidar data is from a Velodyne HDL-64E, which uses 64 laser beams and spins at 10 Hz. In addition to the 3D position for each Lidar return, the HDL-64E also measures an 8 bit intensity. Appropriate subsets of each Lidar spin are time stamped to the Applanix data so that refinement of the vehicle poses using algorithms described hereafter will result in refined Lidar positions.

The test vehicle may also include a forward facing a high definition colored camera, a forward facing radar, a GPS antenna and inertial measurement unit, side facing radars, and a rotary encoder for vehicle travel distance information.

Figure 2:
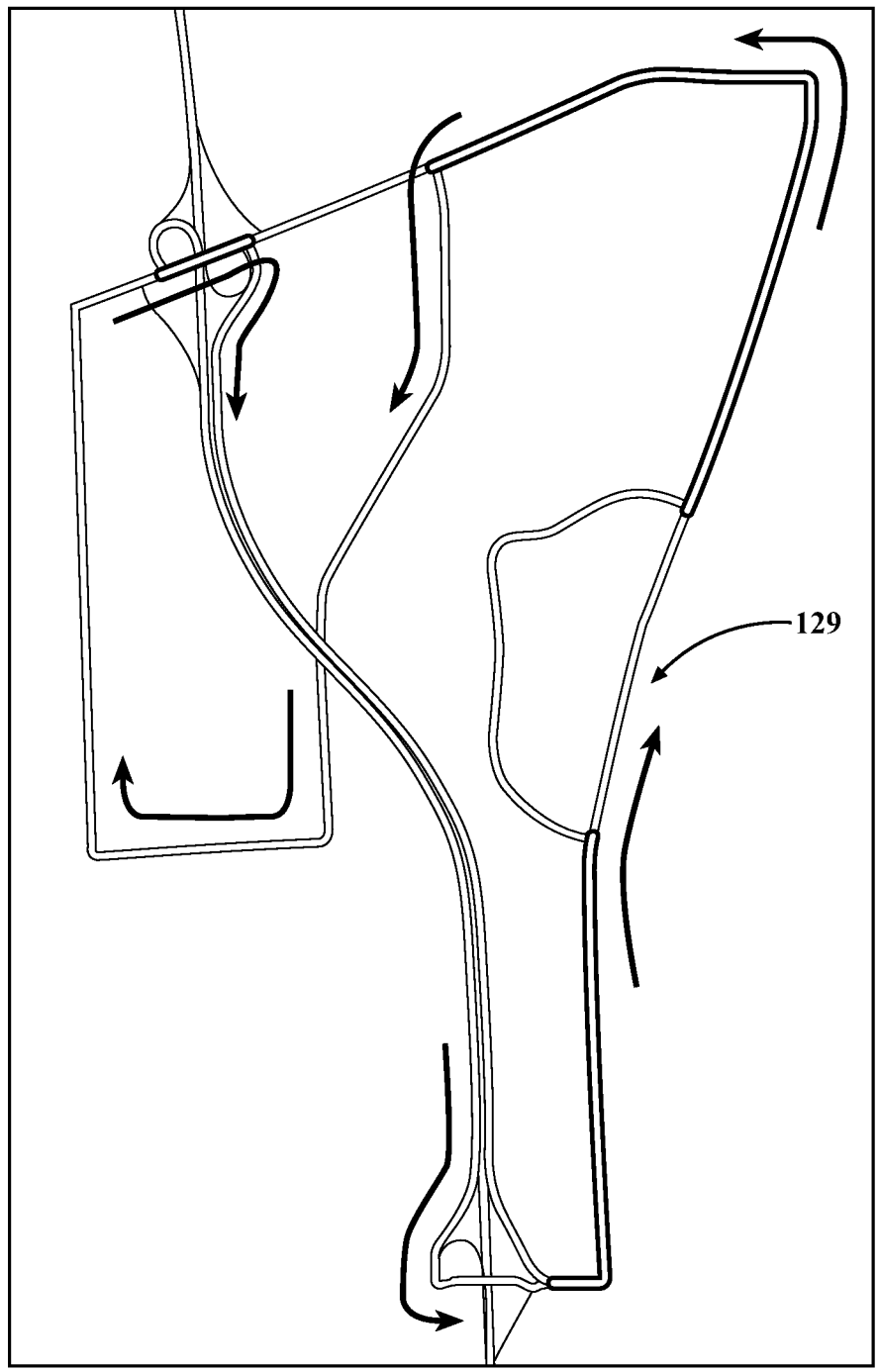
FIG. 2 is a pictorial representation of a road course followed in collecting Lidar information.

The test vehicle is driven in one direction along the route 129, as seen by example in FIG. 2. The route 129 includes a variety of different roads, including a multi-lane freeway with entrance and exit ramps, two lane rural roads and a multi-lane bi-directional street.

The test vehicle is driven in one lane along the route 129 at least once. Multiple passes may be employed to improve the accuracy of the sensor data 118 by picking up additional road indicators, as described hereafter, which may be hidden or disrupted by adjacent traffic, pole reflectivity, vehicle speed and other factors.

The present method models an inference problem that combines coarse structured prior map data 116 with precise sensor data 118 including Lidar data in a number of inference algorithms to generate accurate road lane information with only a single pass of a test vehicle along the road. The method generates, from the coarse map data 116 and precise sensor data 118, the number of lanes, the center of each lane as well as the presence of any bicycle lanes, entrance and exit lanes, road lane number changes, etc.

Figure 7:
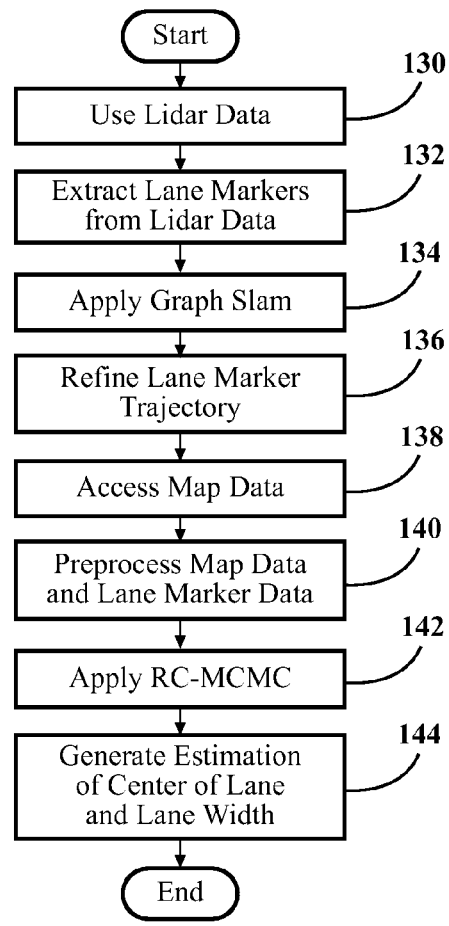
FIG. 7 is a block diagram depicting the steps used in the present method for generating accurate lane level maps.

The first step 130 in the method, as shown in FIG. 7, is to access the sensor data 118. This generates mid-level lane features shown in FIG. 3A, and in step 132 in FIG. 7.

A consistent data set is generated by applying a variant of GraphSlam, modified to optimize the vehicle trajectory with respect to a number of distinctive features that can be readily identified from the sensor data 118. Such features include lane markers/paint, curves, road signs and poles. Lane markers are of particular interest as they can constitute the primary sensor data 118 used for lane estimation.

The first step in generating consistency in the sensor data 118 is to apply a 1D Laplacian filter to the intensity (reflectivity) returns for each beam of the 3D laser. This gets a response due to the road paint having different reflectivity characteristics than the road surface. Next, a RANSAC algorithm is applied using the 3D positional data associated with each response to remove outliers and to generate lane-segment features shown by the three lines in FIG. 3A.

Figure 3A:
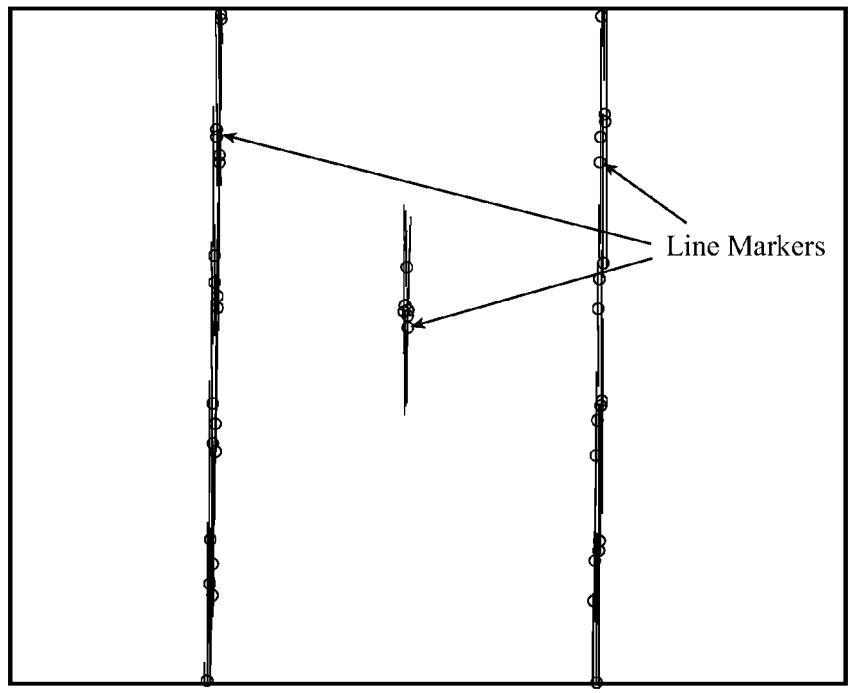
FIGS. 3A, 3B, and 3C are pictorial representations of initial lane features created by the present method.

The GraphSlam algorithm, step 134, FIG. 7, iterates between a data association step and an optimization step. The data association step uses a threshold based on distance. On each data association step, new positions are calculated for each feature based on the new vehicle positions generated from the optimization step. The threshold is increasingly tightened, and this process is repeated until convergent. The output of the GraphSlam algorithm is a refined vehicle trajectory, which is subsequently used to re-project the sensor scan data as shown in FIG. 3A and step 136 in FIG. 7.

The method makes use of weak prior information as the map data 116, for example in the form of coarse map information, such as OSM map information. This information is limited in that it has large positional inaccuracy of up to a few meters and it does not contain data about the number of lanes in a particular road. The present method makes use of the sensor data 118, for example including Lidar data, to infer precise positional estimates of all lanes in a road.

Figure 3B:
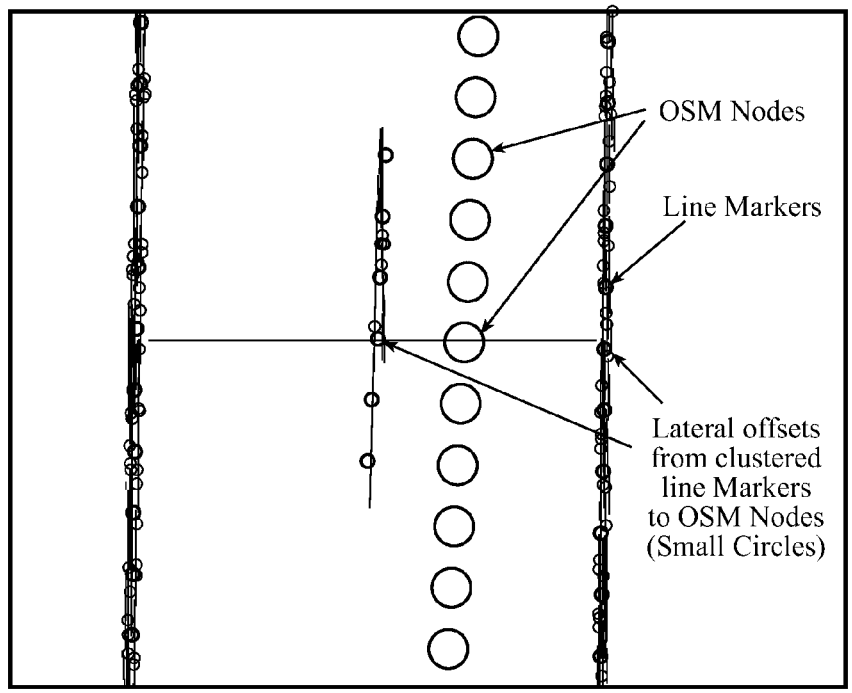

Map data 116, such as OSM map information, is used as a weak prior data on the position and existence of a road, see step 138, FIG. 7. A way represented in the OSM map information is defined by $\{p_1, p_2, \ldots p_n\}$: a set of nodes along the way. These nodes are evenly spaced at $\delta_O = 1$ meter intervals. The lane marker estimations process uses the same lane marker/paint features that were used in the GraphSlam algorithm, which take the form of relatively short (0.5 to 2 meter) line segments $\lambda$ specified by the 3D coordinates of both endpoints, step 140, FIG. 7. For each node $p_i$, first, the angle $\theta_i$ to node $p_{i+1}$ is computed, and then a search is performed to find the line markers lateral to the node $p_i$. The search is over a rectangle defined by the vectors of length $\delta_O/2$ forward and backward along $\theta_i$, and for a fixed distance in both directions perpendicular to $\theta_i$. All line segments falling within this rectangle are collected into a set $\Lambda^-_i = \{\lambda_j\}$. This set is then filtered based on each segments' alignment to $\theta_i$, resulting in $\Lambda_i = \{\lambda_j: \lambda_j \in \Lambda_i, \|\theta_{\lambda_j} - \theta_i\| < \theta_{thresh}\}$, where $\theta_{\lambda_j}$ is the angle of the line segment. Then all the line segments in $\lambda$ are clustered using a greedy approach based on separation distance. The resulting clusters are called lane markers. For each lane marker, the mean offset distance $z_i$ from the node $p_i$ is computed. This offset distance will be used as an observation tied to this particular node $p_i$ within the particle filter, as shown in FIG. 3B.

Next, the lane markers are grouped longitudinally, using a greedy, flood-fill algorithm in the longitudinal direction. The purpose of this step is to generate additional binary features for each lane marker. Some groups of lane markers, —such as those corresponding to solid, well-painted lines, will extend for a long longitudinal-distance (tens or hundreds of meters) on rural or semi-rural-roads, while in other cases, such-as dashed lines, or areas with many intersections, the groups will be short, on the order of a few meters.

Given these groupings, three additional features are computed which prove to be useful for lane estimation. First, two binary features are calculated, which encodes on which side(s) of the lane marker a lane can exist (e.g. for a right most lane marking, a lane on the right cannot exist). These binary features are computed, namely, has-l and has-r, by looking at the entire lane segment data. For the entire lane segment, the number of lane marking observations ($z_i$) that lie on the either side ($c_k^l$ and $c_k^r$) are then counted. Then, $$\text{has-}j = (c_k^j \geq \delta_c), j \in \{l, r\}$$

where $\delta_C$ is a threshold parameter. The third binary variable encodes where a lane marker is dashed. All of the lanes are filtered out which are bigger than a standard dash lane found in the United States. Then lane marker groups are connected which are at a set distance apart and have similar orientation. These are marked as a dashed line.

Figure 3C:
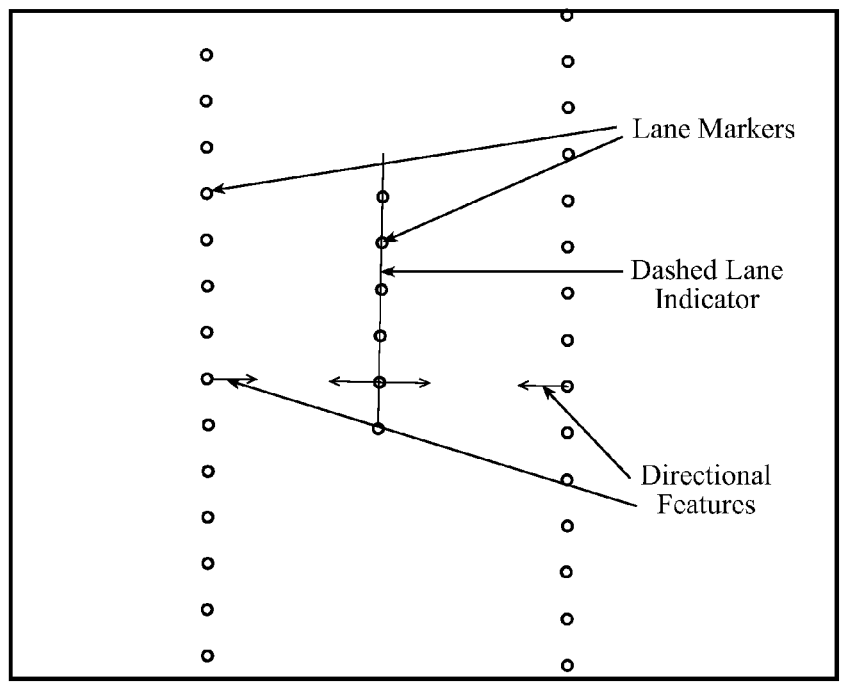
Figure 4:
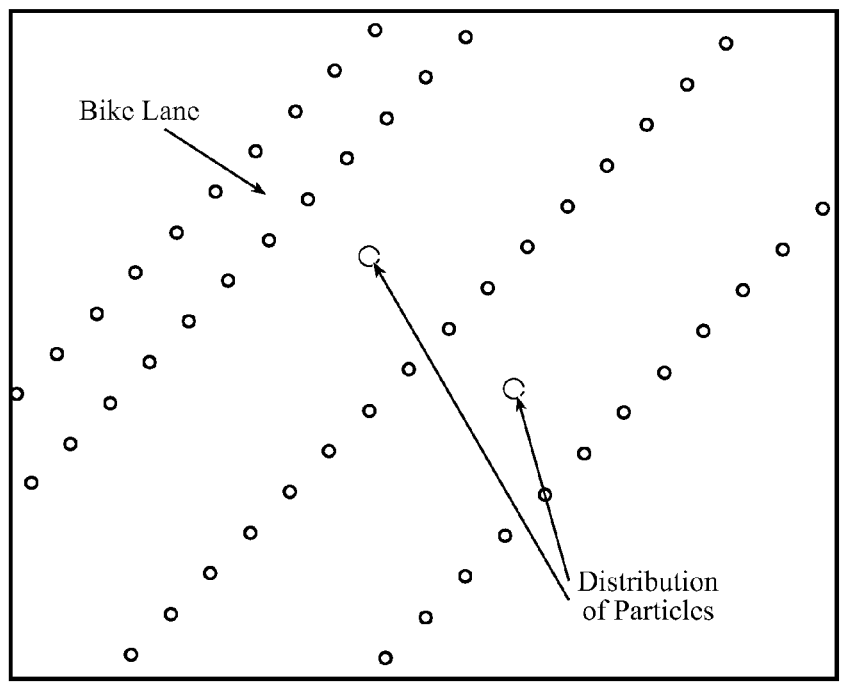
FIG. 4 is a pictorial representation of a road lane map implemented using the present method.
Figure 5:
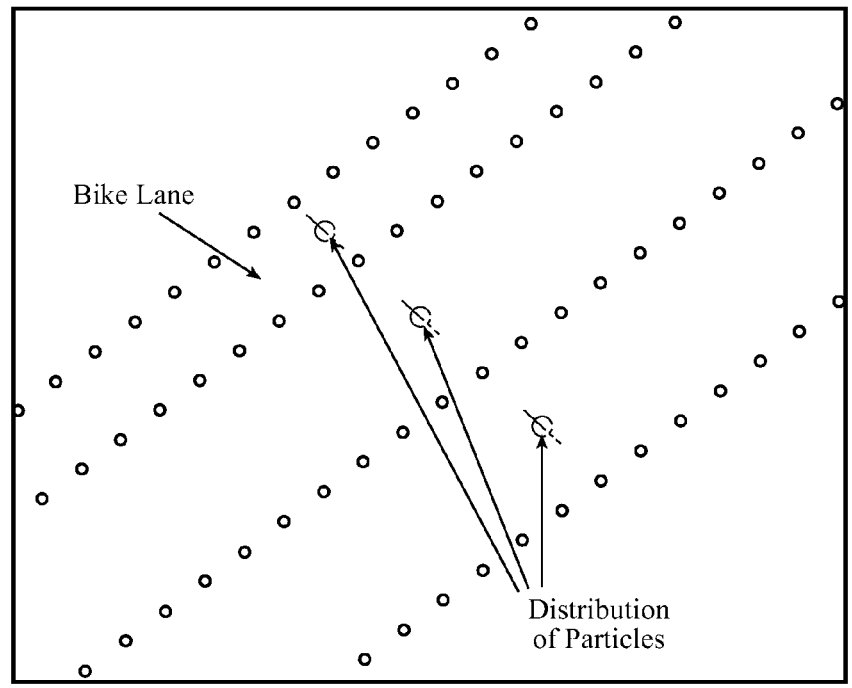
FIG. 5 is a pictorial representation of road lane features created by the present method.

The above binary features, illustrated in FIG. 3C, give important cues to interpreting the lane data, as will be shown in the development of the following measurement functions.

MCMC methods work by constructing a Markov Chain over possible states X in such a way that the stationary distribution of the chain is equal to the target distribution. Therefore the sampled set $X=\{X^{(p)}\}p=1 \ldots m$ drawn from this chain can be used in place of samples generated via particle filtering methods. A Metropolis-Hastings algorithm is used which is characterized by defining a Markov claim over state samples $X_n^s$ as a result of two steps.

1) Propose: Generates a candidate next state $X^*$ given the current state $X^{(s)}$, using the proposal function $Q(X^*, X^{(s)})$. This function should be defined in both directions, i.e. $Q(X^{(s)}, X^*)$ exists and is computable.
2) Step: Compute the acceptance ratio:

$$a = \frac{p(X_n^* | Z_n) Q(X_n^{(s)}, X_n^*)}{p(X_n^{(s)} | Z_n) Q(X_n^*, X_n^{(s)})}$$

and set $X_n^{(s+1)} \leftarrow X_n^*$ with the probability min (1, a).

The set of sampled states $\{X_n^{(s)}\}_{s=1 \ldots S}$ has size larger than m, due to two common modifications used to improve the sample approximation: burn-in and subsampling. Additionally, it should be noted that the set of sampled states does not contain weights, in contrast to a particle filtering approach. This is due to the fact that the observations are already accounted for in the acceptance ratio. Therefore, using the intersection potential, multiple components, and a particle representation:

$$p(X_n | Z_n) \tilde{\propto} p(z_n | X_n) \times \sum_{p=1 \ldots m} \prod_i p(x_{n,i} | x_{(n-1),i}^{(p)}) \prod_{i,j \in E} \psi(x_{n,i}, x_{n,j}) \quad (5)$$

Combining with the acceptance ratio gives the key basic equation for MCMC filtering with multiple components and interaction potentials:

$$a = \frac{p(Z_n | X_n^*) \sum_p \prod_i p(x_{n,i}^* | x_{(n-1),i}^{(p)}) \prod_{i,j} \psi(x_{n,i}^*, x_{n,j}^*) Q(X_n^{(s)}, X_n^*)}{p(z_n | X_n^{(s)}) \sum_p \prod_i p(x_{n,i}^{(s)} | x_{(n-1),i}^{(p)}) \prod_{i,j} \psi(x_{n,i}^{(s)}, x_{n,j}^{(s)}) Q(X_n^*, X_n^{(s)})} \quad (6)$$

One limitation of basic MCMC is that it is unable to represent states of different dimensionality in a straightforward way, making it difficult to handle varying numbers of components. Reversible Jump MCMC (RJ-MCMC) methods were developed to overcome this limitation in a principled framework. In this framework, trans-dimensional moves are defined that may increase or decrease the number of parameters in the state space. This is accomplished using the dimension matching strategy. It is required that every move have a reverse move, so that it is possible to get back to any state interpretation (both dimensionally and meaning) after a move away from it. Beyond this requirement, the RJ-MCMC method is highly customizable. In RJ-MCMC, each step in the chain is generated by probabilistically selection a move, and then applying the proposal and acceptance steps associated with that move.

Using RJ-MCMC, the method introduces trans-dimensional proposal moves. Identifiers $k_n$ are introduced into the equations as follows. The proposal function becomes:

$$Q(k, X_k, k^*, X_{k^*}^*)$$

and the acceptance ratio is:

$$a = \frac{p(k_n^*, X_{k_n^*}^* | z_n) Q(k_n^{(s)} X_{k_n^{(s)}}^{(s)}, k_n^*, X_{k_n^*}^*)}{p(k_n^{(s)}, X_{k_n^{(s)}}^{(s)} | z_n) Q(k_n^* X_{k_n^*}^*, k_n^*, X_{k_n^*}^*)} \quad (7)$$

This can be combined with Equation 5 to give a result analogous to Equation 6. This equation along with a set of moves and each move's proposal function Q defines the RJ-MCMC particle filter.

Different move types are introduced, two of which were trans-dimensional birth and death moves, and one update move which modifies the state of one component. As can be seen Equation 5, computing the acceptance ratio involves a sum over all particles, which can be computationally costly. Therefore, for the birth, death, and update moves, a sampling based strategy is employed which greatly reduces the computational costs.

Update: the proposal carries forward all components from the previous state $X_n^{(s)}$ except one, which is sampled according to the prior distribution and motion model. By employing a sampling-based approximation terms will cancel and the acceptance ratio is a function of only the observation and interaction potentials involving only the selected component being modified. For the randomly selected component i*, the acceptance ratio is:

$$a = \frac{p(z_n | X_n^*) \prod_j \psi(x_{n,i^*}^*, x_{n,j}^*)}{p(z_n | X_n^{(s)}) \prod_j \psi(x_{n,i^*}^{(s)}, x_{n,j}^{(s)})} \quad (8)$$

The proposal algorithm is:
1) Sample Prior Component: Randomly choose a component i*, and a particle $x_{n-1}^{(p)}$ from the set representing $p(X_{n-1}|Z_{n-1})$.
2) Proposal Distribution: Sample $x_{n,i^*}^* \sim p(x_{n,i^*}|x_{(n-1),i^*}^{(p)})$ from an update or motion model.

Birth: This proposal is adding an additional component to the state, while keeping the rest of the components unchanged. Using shorthand qb for the proposal function, let $$q_b(i^*) = \frac{1}{N} \sum_p p(X_{n,i^*}^* | X_{n-1}^{(p)}) \prod_i p(X_{n,i} | X_{n-1}^{(p)}) \delta_{X_{n,i}^*}(X_{n,i}^*) \quad (9)$$

then the acceptance ratio is given by $$a = \frac{p(z_n | X_n^*) \prod_j \psi(x_{n,i^*}^*, x_{n,j}^*) p_d q_b(i^*)}{p(z_n | X_n^{(s)}) p_b q_d(i^*)} \quad (10)$$

where $p_b$ and $p_d$ are the probabilities of selecting the birth and death moves, respectively.

Death: This proposal removes a component from the state, while keeping the rest of the components unchanged. Let $$q_d(i^*) = \frac{1}{N}\sum_p \prod_{i,i\neq i^*} p(X_{n,i} | X_{n-1}^{(p)}) \delta_{X_{n,i}}(X_{n,i}^*) \qquad (11)$$

And the acceptance ratio is given by $$a = \frac{p(z_n | X_n^*) p_b q_d(i^*)}{p(z_n | X_n^{(s)}) \prod_j \psi(x_{n,i^*}^{(s)}, x_{n,j}^*) p_d q_b(i^*)} \qquad (12)$$

Given these frameworks, the formulation of the dual problem into a RJ-MCMC framework, and the incorporation of prior information into the RJ-MCMC inference process will now be described.

The dual RJ-MCMC is implemented as RJ-MCMC moves with some moves corresponding to the special form of the dual update directly incorporated into the moves. As with the other MCMC moves, one component is updated at a time. Given the framework already in place, specification of the dual moves is straightforward.

Dual-Update: Like the update, only one randomly selected component i* is operated on using a sampling procedure analogous to a dual particle filter: sampling from $x^*_{n,i^*}$ according to the observation distribution $p(Z_{n,i^*}|x^*_{n,i^*})$ for fixed $Z_{n,i^*}$. Computing this inverse function can be done using kernel density estimation.

The acceptance ratio then must account for the state transition and interaction term in order to equate to the starting point, Equation 5. As in update above, terms are cancelled and a sampling-based previous particle selection (for particle p) is used to simplify the acceptance ratio for randomly selected component i*:

$$a = \frac{p(x_{n,i^*}^* | x_{(n-1),i^*}^{(p)}) \prod_j \psi(x_{n,i^*}^*, x_{n,j}^*)}{p(x_{n,i^*}^{(s)} | x_{(n-1),i^*}^{(p)}) \prod_j \psi(x_{n,i^*}^{(s)}, x_{n,j}^{(s)})} \qquad (13)$$

Dual-Birth: This proposal is adding an additional component to the state, while keeping the rest of the components unchanged. First, the observations are pruned to remove all observations corresponding to components in the current state $X_n^s$, . From the remaining observations, sample from $x^*_{n,i^*}$ according to the observation distribution $p(Z_n|x^*_{n,i^*})$ for fixed $Z_{n,i^*}$, so that $$q_b^d = p(Z_n|x^*_{n,i^*}) \qquad (14)$$

this component has no prior component to condition on, and so the acceptance ratio is given by $$a = \frac{\prod_j \psi(x_{n,i^*}^*, x_{n,j}^*) p_d q_b^d(i^*)}{p_b q_d^d(i^*)} \qquad (15)$$

where $p_d$ and $p_d$ are the probabilities of selecting the birth and death moves, respectively.

Dual-Death: This proposal removes a component from the state, while keeping the rest of the components unchanged. Because the observation probability $p(Z_n|X^*)$ is proportional to the remaining components, it is inversely proportional to the removed component $x_{n,i^*}$. Therefore sample according to this inverse distribution, giving $$q_d^d(i^*) = \frac{1}{p(Z_n | x_{n,i^*}^{(s)})} \qquad (16)$$

and the acceptance ratio is given by $$a = \frac{p_b q_d^d(i^*)}{\prod_j \psi(x_{n,i^*}^{(s)}, x_{n,j}^{(s)}) p_d q_b(i^*)} \qquad (17)$$

While these dual moves take on a special form due to their connection with a recursive Bayes filtering equation, it is straightforward to combine these with other move sets that are developed for certain problems. In this way, the RJ-MCMC framework is extremely flexible.

The full RJ-MCMC problem is specified by a tuple (M, $\Theta_M$, $\eta$) where the set M={$\mu_i$} contains the collection of RJ-MCMC moves $\mu_i$, each of which has an associated parameter vector $\theta\mu$ i resulting in the set $\Theta_M=\{\theta_{\mu i}\}_{i=1 \ldots |M|}$. For instance, an update move that perturbs the location of one component may be parameterized by its variance. The multinomial distribution $\eta$ is of size |M| and specifies the probability of each move being selected. Note that there are constraints on $\eta$, it must not specify a distribution that violates the reversibility condition: every move must have a reverse move that returns the state to the initial size and interpretation.

Next a method is employed to incorporate prior information into the inference process. This contribution is distinct from the other two and can be applied to any RJ-MCMC instance with multiple or repeated chains.

Within the context of filtering, each time step is a new RJ-MCMC inference problem, and so the procedure is re-specified so long as the new RJ-MCMC procedure is consistent with the old. "Consistent" means that the procedure is able to propose moves and compute the acceptance ratio for any state generated in the last time step, and makes use of the particle set in a probabilistically valid way. Let p be a set of features derived from the prior information, for instance in the lane estimation problem an informative feature is the distance from the current state to the nearest intersection on the coarse map. In the most general formulation, incorporation of prior information into the inference process is accomplished via the prior map: $\psi: \rho \rightarrow \{\Theta_M, \eta\}$ mapping the prior features to a fully specified RJ-MCMC problem, where the M is a fixed set of all possible moves for this problem. Note that the move distribution $\eta$ can set the probability of any move $\mu_i$ to 0, so that it is possible to specify valid subsets of M to apply. "Valid" means a distribution that satisfies the reversibility condition.

The overall Dual RJ-MCMC PF with Priors algorithm is then specified in Algorithm:
Input: m→number of particles
Input: t→percentage of new particles
for n=1:N do
 $X \leftarrow \emptyset$ while need more particles do Generate $\rho^*$ from prior information $\{\eta^*_M, \eta^*\} \leftarrow \psi(\rho^*)$Select $\mu^* \sim \eta^*$ using M Propose X* using $\mu^*$ with parameters $\Theta_M^*$ Compute the acceptance ratio a using the equation associated with $\mu^*$, and set $X_n^{(s+1)} \leftarrow X^*$ with probability min(1,a)
end Subsample $X_\lambda$ according to burn-in and subsampling schedule.

end

The method can be demonstrated on a large-scale real-world dataset that is used for generating high-fidelity lane level estimation of roads, intersections, and highways.

The dataset consists of a set of scans represented by the sensor data 118 initially aligned with a high-precision positioning system, and a structurally informative coarse map represented by the map data 116 used as prior information from the OSM project. The high-precision positioning system does not fully represent lane level information on its own due to a) not driving in every lane, and b) poor positioning and lane changes; and so we do not use the positioning data in the inference.

The dataset is refined using GraphSlam to ensure consistent position estimates. This serves to both align the input features, as well as to ground the data in a consistent and physically meaningful reference frame.

The lane estimation algorithm is comprised of two phases: 1) generation of mid-level lane features, which are the input observations for phase 2) inference using Dual RJ-MCMC-PF to estimate the lanes.

The GraphSlam algorithm has been adapted to optimize the vehicle trajectory with respect distinctive features from the sensor data 118. The features corresponding to lane markers are of special interest, as they are the primary input in lane estimation. The output of GraphSlam is a refined vehicle trajectory, which is subsequently used to re-project the features, resulting in the line-segment features $\lambda$.

Both the lane marker estimation and the particle filtering portions of the approach make use of weak prior information, in the form of OSM map information represented by the map data 116. This information is limited in that it, first, has large positional inaccuracy (up to few meters for our test scenario), and, second, it does not contain data about the number of lanes. Thus one has to leverage significantly on local data from Lidar scans represented by the sensor data 118 to infer precise positional estimates of all lanes in the scene. This approach to particle filtering is unconventional in that the state of each component is tied to OSM map nodes. Similarly, the OSM map defines the subset of local sensor data 118 to be used.

Map data 116, such as OSM map information, is used as a weak prior on position and existence of a road. A way represented in the OSM map information is defined by $\{p_1, p_2, \ldots p_n\}$: a set of n nodes along the way. These nodes are evenly spaced at $\delta_O = 1$ meter intervals. The lane marker features take the form of relatively short (0.5 to 2 meter) line segments $\lambda$ specified by the 3D coordinates of both endpoints.

For each node $p_i$, the line segments that are laterally located are collected into a set which is filtered based on alignment angle and clustered using a greedy algorithm to form the set of lane markers. For each lane marker, the mean offset distance $z_i$ from the node $p_i$ is computed. This offset distance is an observation tied to the node $p_i$. See FIG. 3B.

As described above, based on these features, three additional features are computed. First, two binary features are calculated, which encodes on which side(s) of the lane marker a lane can exist (e.g. for a right most lane marking, a lane on the right cannot exist). These binary features namely, has-l and has-r are computed. The third feature represents whether the lane marker is-dashed. These features, illustrated in FIG. 3C, give important cues to interpreting the lane data.

The particle filter state is tied to the nodes, which have a clear ordering to define transitions. This also serves to tie the particle filter state to an absolute (GPS) coordinate frame. The estimated state is $x_n: \{x_n^1, x_n^2 \ldots x_n^m\}$ where m is number of lanes estimated at $n^{th}$ node in the way and $x_n^i$ is state of the $i^{th}$ lane estimate (component). The state of each lane is its offset from the OSM node and its width $\{o_n^i, w_n^i\}$. The observations are $z_n$: {Lane markers at $n^{th}$ OSM node} described above.

The RJ-MCMC inference procedure, as described, uses the features and state representation outlined above. The six RJ-MCMC moves are used, and leverage prior information by generating prior features based on intersection locations from the OSM map information represented by the map data 116. These features are fed into a hand-designed prior function, resulting in one of two distributions over moves: Close to Intersection:

$$P_B^C = 0.1, P_D^C = 0.1, P_U^C = 0.8,$$

$$P_B^D = 0.0, P_D^D = 0.0, P_U^D = 0.0$$

Otherwise:

$$P_B^C = 0.05, P_D^C = 0.05, P_U^C = 0.4,$$

$$P_B^D = 0.05, P_D^D = 0.5, P_U^D = 0.4$$

Even though these prior functions are hand crafted, algorithms can be developed to learn these distributions from the labeled datasets. Our pairwise interaction potential $\psi(x_i, x_j)$ is expressed as a Gibbs Distribution:

$$\psi(x_i, x_j) \propto \exp(-g(x_i, x_j)) \qquad (18)$$

where $g(x_i, x_j)$ is the penalty function on amount of lane overlap between two adjacent lanes. Specifically for adjacent overlapping lanes, $$g(x_i, x_j) = \gamma * \left(|o_j - o_i| - \frac{w_i + w_j}{2.0}\right).$$

Figure 6A:
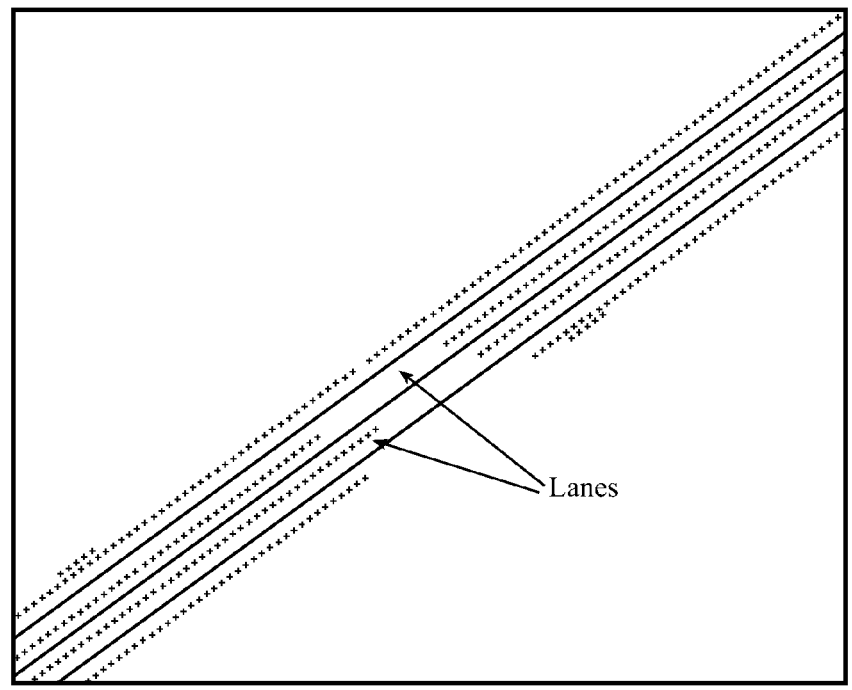
FIGS. 6A, 6B, 6C, and 6D are pictorial representations of road lane estimations generated by the present method.
Figure 6B:
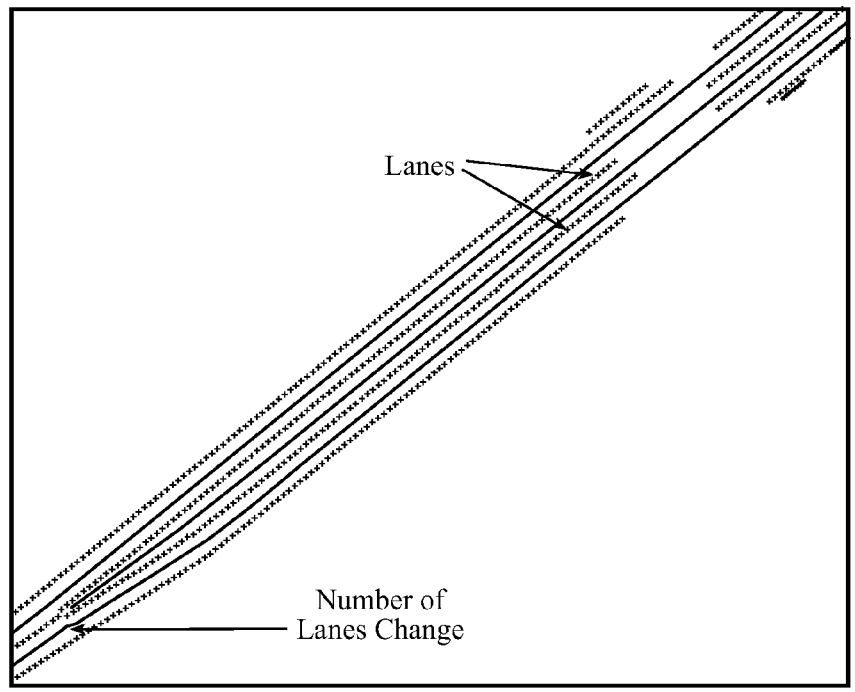

Referring now to FIGS. 6A and 6B, lane estimates using the present method are illustrated. FIGS. 6A and 6B show lane estimations on country roads. Even though there is missing data intersections, the two road lanes are tracked successfully.

Figure 6C:
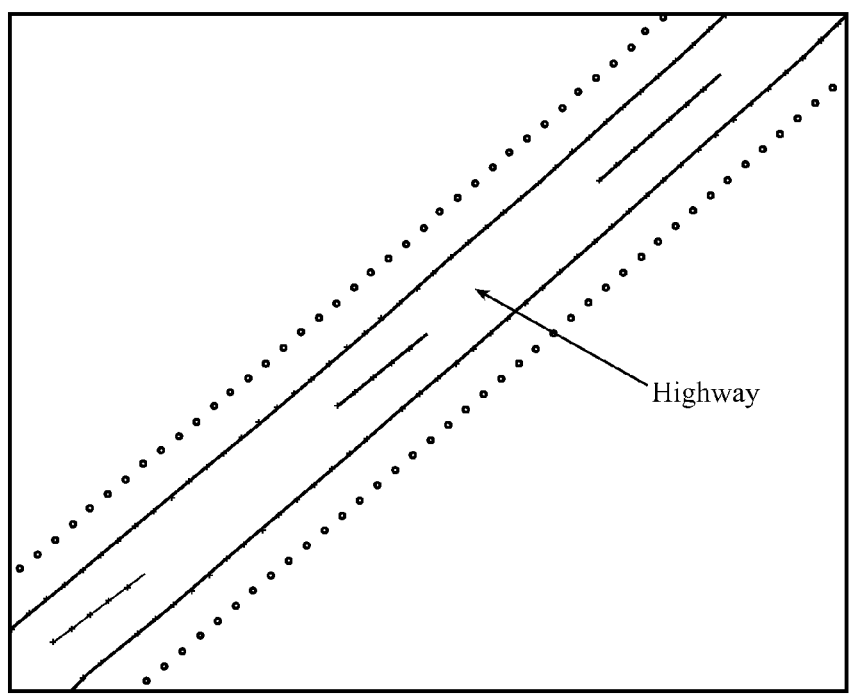
Figure 6D:
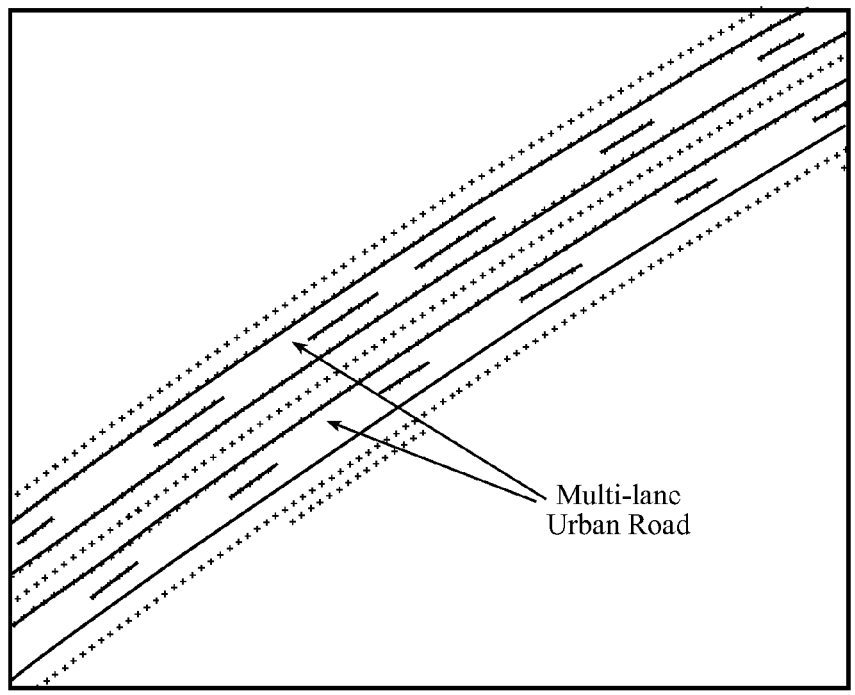

FIG. 6C depicts lane estimation on a highway with dashed lines. FIG. 6D illustrates lane estimation on multi lanes urban roads.

In all of the lane estimation situations shown in FIGS. 6A-6D, the method did not have any prior information of the number of lanes in each road.

To evaluate the accuracy of this method, the lane estimates are compared with hand labeled road network data for 28 km of road. The hand-labeled road network data consists of rural roads, urban roads and freeways which is shown in FIG. 2, but which did not include bicycle lanes. The number of particles are set to 5,000, for example, and the distribution over the moves mentioned above are used. FIGS. 6A-6D illustrate qualitative results of lane estimates for each type of scene.

The results are evaluated using two metrics, mean positional error and number of nodes for which a lane center is intentionally incorrectly estimated a lane centers. Quantitative results are shown in Table I. These results show that this method generate highly accurate lane-level maps.

TABLE I

| Quantitative Results | | |
|---|---|---|
| Method | Mean Error(m) | Max Error(m) |
| Dual RJMCMC - urban | 0.05 | 0.84 |
| Dual RJMCMC - highway | 0.03 | 0.55 |

What is claimed is:

1. A method for determining lane characteristics of a road comprising:
   obtaining image sensor generated road lane marker data representing lane markers on a road;
   accessing coarse road map data representing the road;
   determining, using a computer, road segment node locations from the coarse road map data;
   tying, using a computer, the road lane marker data to the road segment node locations; and
   applying dual reversible jump-Markov chain Monte Carlo filtering to the tied road lane marker data and road segment node locations and to lane characteristics estimates for the road at the segment node locations to generate a road lane map including all lanes present at any road segment node location.

2. The method of claim 1 further comprising:
   estimating, using a computer, the characteristics of one of a bicycle lane and a road exit lane or entrance lane adjacent to a road lane.

3. The method of claim 1 further comprising:
   using the dual reversible jump-Markov chain Monte Carlo filtering to detect a transition of one of one road lane into at least one additional road lane, and two side-by-side road lanes into one road lane.

4. The method of claim 1 further comprising:
   refining the road lane marker data by use of GraphSlam.

5. The method of claim 1 wherein the step of tying the road lane marker data to the road segment node locations comprises:
   generating each of the road segment node locations one at a time;
   computing an angle of one road segment node location to an adjacent road segment node location;
   finding, from the road lane marker data, all of the line segments lateral to the one road segment node location within a rectangle including the road segment node location;
   forming a set of the found line segments;
   filtering the set of found line segments;
   clustering the line segments in the filtered set of found line segments to form a set of lane markers;
   computing, for each lane marker in the set of lane makers, a mean offset distance from the one road segment node location;
   grouping the lane markers in the set of lane makers longitudinally; and
   calculating binary features of the lane markers.

6. The method of claim 1 wherein the lane characteristics estimates include at least one of the number of lanes, the width of the lanes, and the center of each lane for the road at the road segment node locations.

7. The method of claim 1 wherein the step of applying the dual reverse jump-Markov chain Monte Carlo filtering comprises:
   constructing a Markov chain over possible states of a plurality of lane characteristics estimates for the road at the road segment node locations;
   carrying over all but one of the lane characteristics estimates and randomly selecting the one lane characteristics estimate;
   proposing a candidate next state for the one lane characteristics estimate; and
   computing an acceptance ratio of a probability that the proposed candidate next state of the one lane characteristics estimate is valid.

8. The method of claim 7 further comprising:
   introducing a plurality of possible trans-dimensional moves to the proposed candidate next state of the one lane characteristics estimate.

9. The method of claim 8 wherein:
   the possible trans-dimensional moves includes at least one of an update move, a birth move and a death move.

10. The method of claim 9 further comprising:
    randomly selecting the one lane characteristics estimate for the at least one of the update move, the birth move, and the death move.

11. The method of claim 8 further comprising:
    incorporating prior information into the dual reversible jump-Markov chain Monte Carlo filtering.

12. The method of claim 8 wherein:
    the plurality of possible trans-dimensional moves includes at least one of a dual update move, a dual birth move, and a dual death move.

* * * * *